US008510093B2

(12) United States Patent
Konno

(10) Patent No.: US 8,510,093 B2
(45) Date of Patent: Aug. 13, 2013

(54) IMAGE PROCESSING APPARATUS, IMAGE PROCESSING METHOD AND COMPUTER READABLE MEDIUM

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1077 days.

(21) Appl. No.: 12/078,163

(22) Filed: Mar. 27, 2008

(65) Prior Publication Data

US 2008/0300858 A1 Dec. 4, 2008

(30) Foreign Application Priority Data

Jun. 4, 2007 (JP) ................................ 2007-147887

(51) Int. Cl.
*G06F 17/28* (2006.01)

(52) U.S. Cl.
USPC ............... 704/2; 704/3; 704/4; 704/5; 704/7; 704/8; 715/264; 382/181; 382/182

(58) Field of Classification Search
USPC .......................................... 704/2–8; 715/264
See application file for complete search history.

(56) References Cited

U.S. PATENT DOCUMENTS

| | | | | |
|---|---|---|---|---|
| 5,517,409 A | * | 5/1996 | Ozawa et al. ..................... | 704/3 |
| 5,727,082 A | | 3/1998 | Sugishima | |
| 5,917,944 A | * | 6/1999 | Wakisaka et al. .............. | 382/190 |
| 6,012,073 A | * | 1/2000 | Arend et al. ................... | 715/236 |
| 6,522,999 B2 | * | 2/2003 | Fuji ................................... | 704/2 |
| 7,299,452 B1 | * | 11/2007 | Zhang et al. ................... | 717/124 |
| 7,729,540 B2 | * | 6/2010 | Koyama et al. ............... | 382/181 |
| 7,783,472 B2 | * | 8/2010 | Nagao et al. ..................... | 704/2 |
| 7,865,353 B2 | * | 1/2011 | Koyama et al. .................. | 704/3 |
| 2002/0013693 A1 | * | 1/2002 | Fuji ................................... | 704/2 |
| 2002/0042790 A1 | * | 4/2002 | Nagahara ......................... | 707/4 |
| 2002/0065088 A1 | * | 5/2002 | Seignol et al. ............... | 455/466 |
| 2002/0152063 A1 | * | 10/2002 | Tokieda et al. .................. | 704/2 |
| 2002/0193983 A1 | * | 12/2002 | Tokieda et al. .................. | 704/2 |
| 2003/0200078 A1 | * | 10/2003 | Luo et al. .......................... | 704/2 |
| 2006/0217954 A1 | * | 9/2006 | Koyama et al. ................. | 704/2 |
| 2006/0217959 A1 | * | 9/2006 | Saito et al. ....................... | 704/2 |
| 2006/0245005 A1 | * | 11/2006 | Hall et al. ..................... | 358/448 |

FOREIGN PATENT DOCUMENTS

| | | |
|---|---|---|
| JP | A-5-324720 | 12/1993 |
| JP | A-7-28829 | 1/1995 |
| JP | A-8-6948 | 1/1996 |
| JP | A-8-129550 | 5/1996 |
| JP | B2-3213197 | 7/2001 |
| JP | A-2003-44461 | 2/2003 |
| JP | A-2006-268150 | 10/2006 |

\* cited by examiner

*Primary Examiner* — Lamont Spooner
(74) *Attorney, Agent, or Firm* — Oliff & Berridge, PLC

(57) ABSTRACT

An image processing apparatus includes a region dividing section, an character recognizing section, a classifying section, a translating section, a calculation section and a correcting section. The region dividing section divides a document image into sentence regions. The character recognizing section recognizes characters in the respective sentence regions. The classifying section classifies the sentence regions into groups in accordance with sizes of the characters. The translating section translates a sentence into a given language for each of the sentence regions. The calculation section calculates a character size of a sentence, which has been translated for each of the sentence regions by the translating section. And The correcting section corrects a size of a translated character of each character region for every sentence region classified into the same group such that the character sizes calculated by the calculating section become equal.

11 Claims, 5 Drawing Sheets

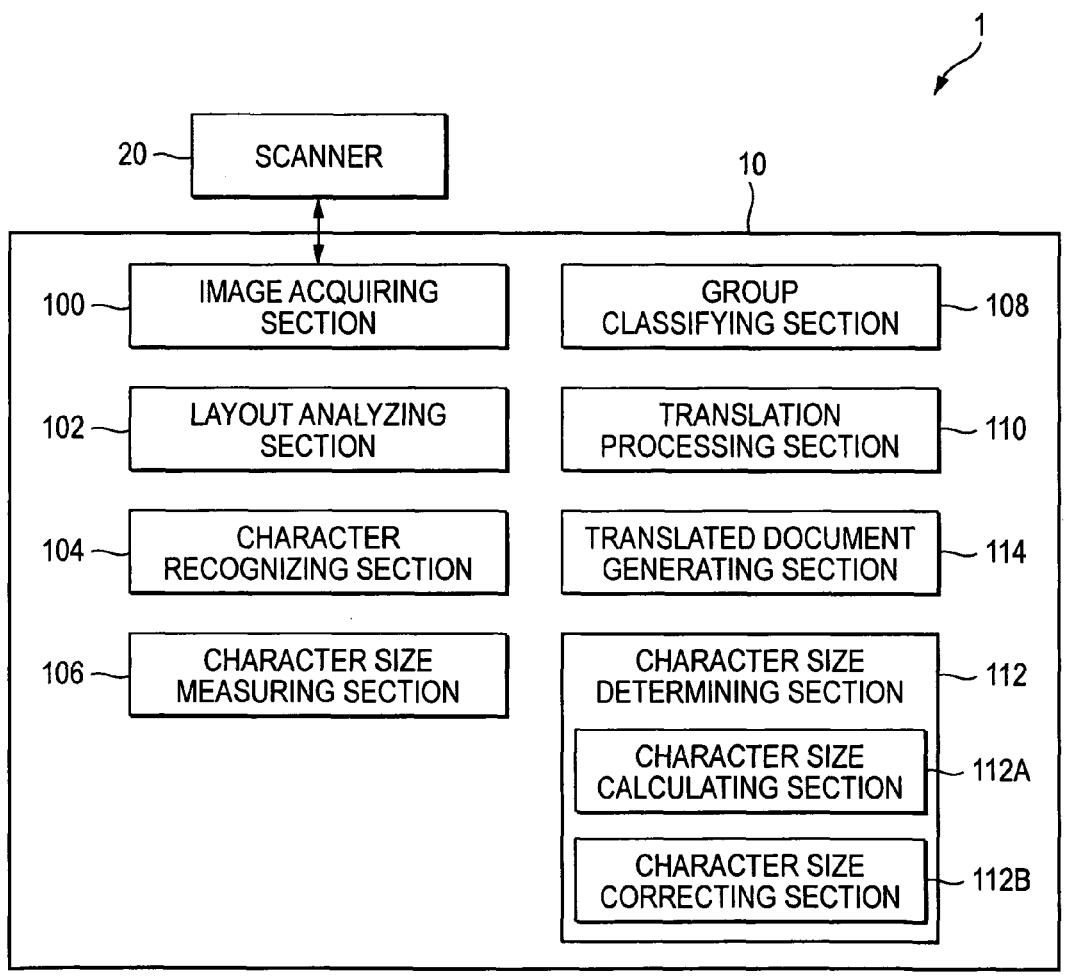

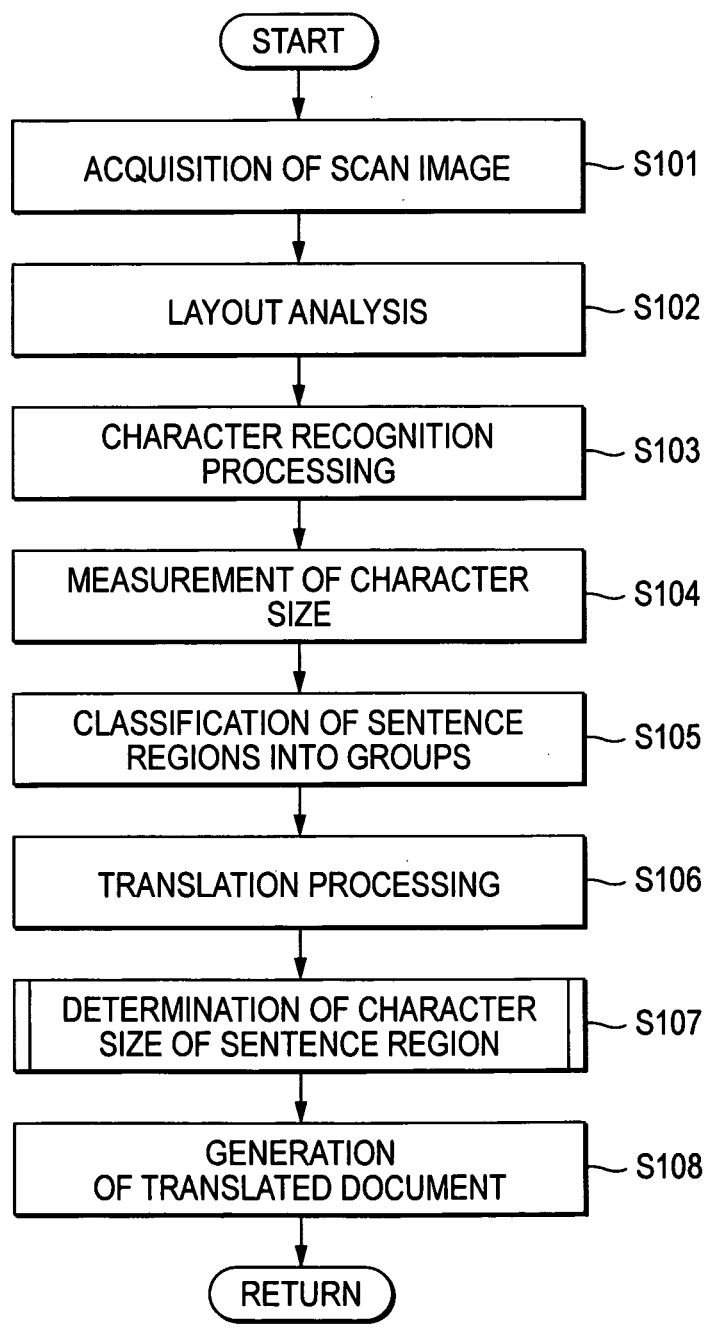

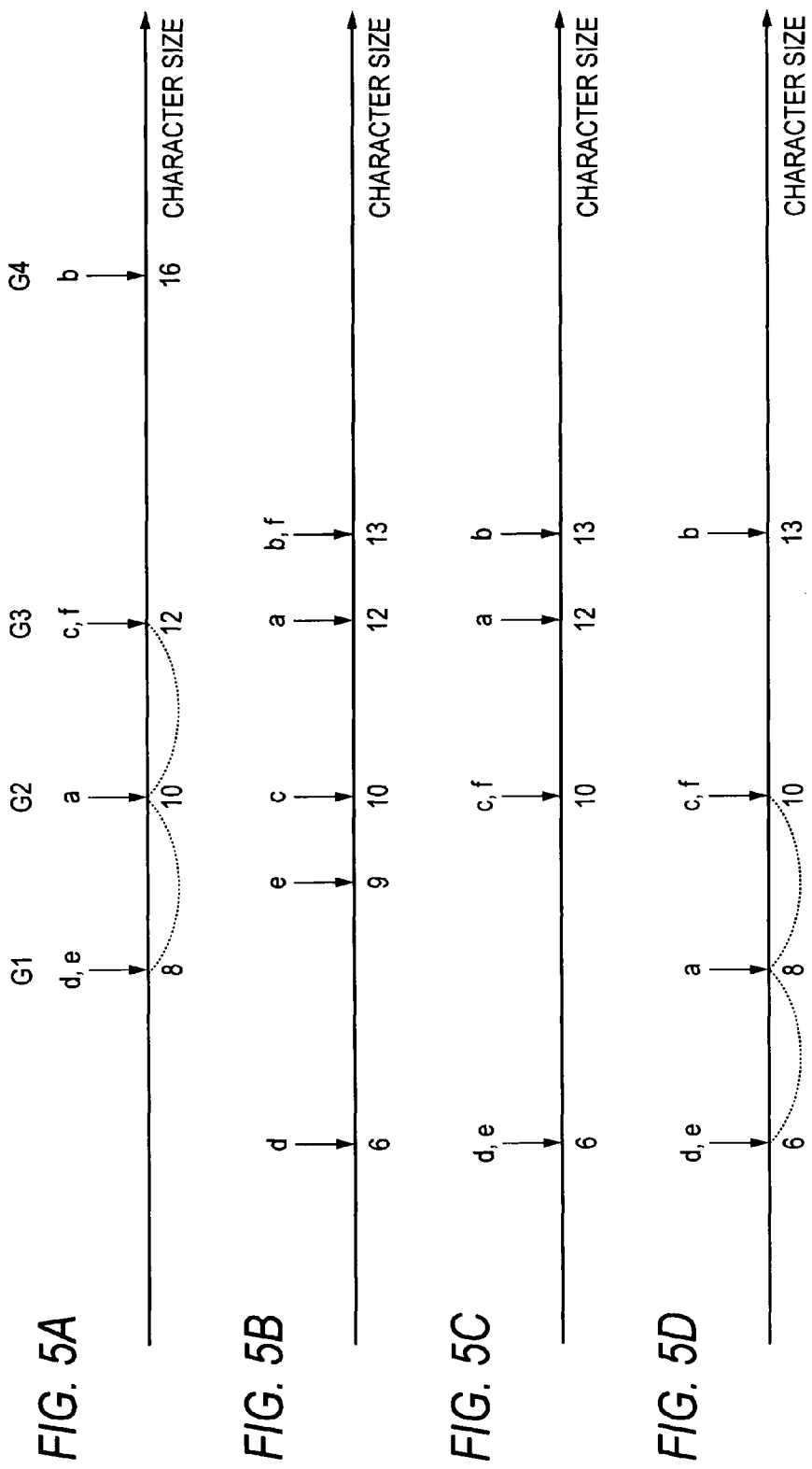

IMAGE PROCESSING APPARATUS, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2007-147887 filed Jun. 4, 2007.

BACKGROUND

1. Technical Field

The present invention relates to an image processing apparatus, an image processing method and a computer readable medium.

2. Related Art

A system of translating a text acquired from a scan document by OCR and outputting a translation in a condition that the translation is made to fit in the layout of an original document is known.

SUMMARY

According to an aspect of the invention, an image processing apparatus includes a region dividing section, an character recognizing section, a classifying section, a translating section, a calculation section and a correcting section. The region dividing section divides a document image into at least one of sentence regions. The character recognizing section recognizes characters included in the respective sentence regions divided by the region dividing section. The classifying section classifies the sentence regions into at least one of groups in accordance with sizes of the characters recognized by the character recognition section. The translating section translates a sentence which includes characters in the corresponding sentence region, into a given language for each of the sentence regions. The calculation section calculates a character size of a sentence, which has been translated for each of the sentence regions by the translating section, based on a size, line spacing, and character spacing of the corresponding sentence region before translation and the number of characters of a sentence after translation. And The correcting section corrects a size of a translated character of each character region for every sentence region classified into the same group by the classifying section such that the character sizes calculated by the calculating section become equal.

BRIEF DESCRIPTION OF THE DRAWINGS

Exemplary embodiment(s) of the present invention will be described in detail based on the following figures, wherein FIG. 1 is a view illustrating the system configuration of an image processing system according to an exemplary embodiment;

FIG. 2 is a flow chart illustrating processing for generating a translated document;

FIGS. 5A, 5B, 5C and 5D are views explaining a specific example of processing for determining the character size of a group.

DETAILED DESCRIPTION

Figure 3C:
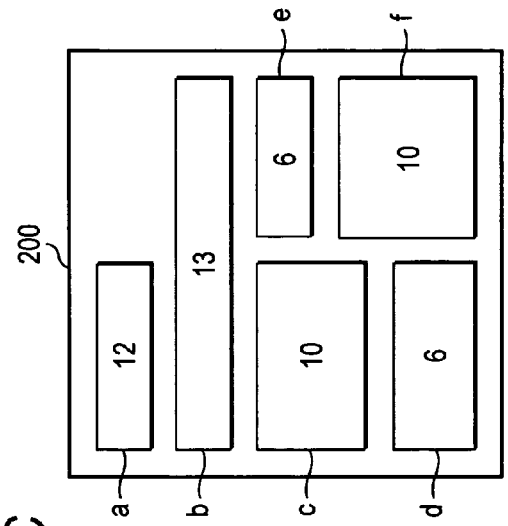
FIGS. 3A, 3B, 3C and 3D are views illustrating an example of the layout of a scan image.
Figure 3D:
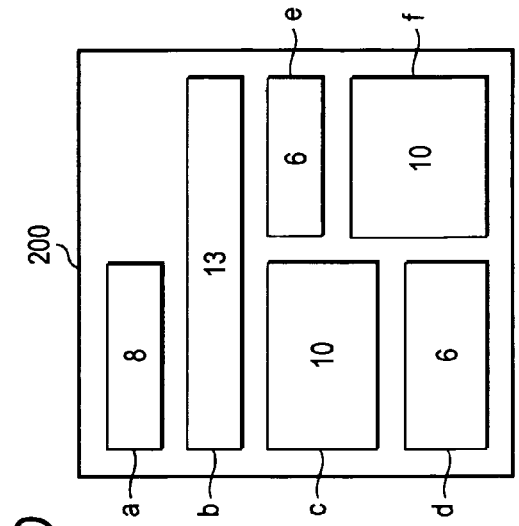

Hereinafter, an exemplary embodiment for executing the invention will be described with reference to the accompanying drawings.

FIG. 1 is a view illustrating the system configuration of an image processing system 1 according to the exemplary embodiment. As shown in FIG. 1, the image processing system 1 is a system including an image processing apparatus 10 and a scanner 20. The image processing apparatus 10 and the scanner 20 according to the exemplary embodiment each have USB interfaces and perform data communication therebetween through a USB cable that connects the USB interfaces with each other.

The scanner 20 is an image scanning apparatus that includes a CCD camera and generates a scan image by scanning a document image using the CCD camera. The scanner 20 transmits the generated scan image to the image processing apparatus 10 connected thereto through the USB interface.

The image processing apparatus 10 is an apparatus that performs image processing on the scan image received from the scanner 20. The image processing apparatus 10 is a computer that includes at least a CPU (central processing unit) or a memory as hardware and that performs processing by causing the CPU to sequentially execute a program stored in the memory. In addition, as shown in FIG. 1, the image processing apparatus 10 includes an image acquiring section 100, a layout analyzing section 102, a character recognizing section 104, a character size measuring section 106, a group classifying section 108, a translation processing section 110, a character size determining section 112, and a translated document generating section 114 as a functional configuration. Functions of the sections may be realized by causing an image processing program, which is stored in a computer-readable information storage medium, to be read into the image processing apparatus 10, which is a computer system, using a medium reader (not shown) and causing the read image processing program to be executed by the image processing apparatus 10. In addition, although an image processing program is herein supplied to the image processing apparatus 10 through an information storage medium, the image processing program may be downloaded from a remote place to the image processing apparatus 10 through a data communication network, such as Internet. Hereinafter, details of the sections will be described.

The image acquiring section 100 receives and acquires a scan image from the scanner 20 connected thereto. The scan image is received through a USB cable.

The layout analyzing section 102 analyzes the layout of the scan image acquired by the image acquiring section 100. The layout analysis is performed by dividing a document image into a title region, a document region, a header/footer region, a drawing region, a table region, and the like. A known technique may be used for the layout analysis. In addition, a region (hereinafter, referred to as a sentence region) where a text is included is extracted, as an object to be processed, from the layout analyzed by the layout analyzing section 102. Extraction of a sentence region may be performed by excluding a region where a character is not included, for example, a region including only a drawing.

The character recognizing section 104 recognizes a character included in a sentence region by OCR processing. The OCR processing is performed by dividing a sentence region into regions corresponding to respective characters, performing pattern matching for each division region, and determining a character included in each division region based on the matching result.

The character size measuring section 106 measures the size (hereinafter, referred to as a character size) of a character included in each sentence region. A measured value of the character size may be an average value calculated from the sizes of characters, which are recognized by the character recognizing section 104, in at least a part of a sentence region or may be a mode of the character sizes. Measurement of the character size is performed for all sentence regions, and the measured character size is stored in a memory so as to be associated with each sentence region.

The group classifying section 108 classifies sentence regions into groups in accordance with the character sizes measured for respective sentence regions. Classification of groups may be performed such that sentence regions having the same character size are classified into the same group or sentence regions having the character sizes, which belong to a predetermined range, are classified into the same group. In the exemplary embodiment, sentence regions having the same character size are made to be classified into the same group.

The translation processing section 110 parses a sentence included in every sentence region and then translates the sentence into a different language (for example, English). Here, the sentence included in a sentence region is text data obtained as a result of recognition performed by the character recognizing section 104. A known technique may be used for the translation processing.

The character size determining section 112 determines the character size of each sentence region after the translation processing. The character size determining section 112 includes a character size calculating section 112A and a character size correcting section 112B.

The character size calculating section 112A calculates the character size allowing a translation to fit in a corresponding sentence region based on the size of a sentence region, line spacing, character spacing, and the number of characters of a translation acquired by translating a text included in the sentence region. The character size calculating section 112A performs character size calculating processing for each sentence region.

The character size correcting section 112B corrects the character size of a translation such that the relative character relationships among sentence region in the original is maintained. First correction performed by the character size correcting section 112B is correction performed such that the character sizes of sentence regions calculated by the character size calculating section 112A become equal for each classified group. For example, the first correction is performed by matching the character sizes of other sentence regions to the minimum character size among sentence regions included in the same group. In this way, the character size in a group is unified so as to fit in a sentence region for every group.

In addition, second correction performed by the character size correcting section 112B is correction performed such that the order of character sizes among groups coincides with that in the original document. The second correction is performed by determining whether or not the order of character sizes among groups coincides with that in the original document and further correcting the character size of a group (hereinafter, referred to as a 'mismatch group'), in which the order does not match, in the case when it is determined that the order of character sizes among groups does not coincide with that in the original document. For example, the second correction may be performed such that the character size included between the character sizes of groups before and after the original order stored for a mismatch group becomes a new character size of the mismatch group.

In addition, in the second correction, a ratio of character sizes among original groups may be stored in a memory such that the character size of each group after translation is further corrected based on the ratio of character sizes stored in the memory. Specifically, assuming that the character sizes of an original group are 5, 10, and 20 points, a ratio 1:2:4 of these character sizes may be stored in a memory and then the character size of a middle group after translation may be corrected such that a ratio of distances between the character size of the middle group and character sizes of groups before and after the middle group becomes (2-1):(4-2), that is, 1:2.

The translated document generating section 114 generates translated document data based on the layout analyzed by the layout analyzing section 102, a translation of each sentence region determined as described above, and the character size of each sentence region. For example, the translated document data may be generated in a data format of a word processor or a predetermined data format, such as PDL data.

Next, a specific flow of processing for generating a translated document from an original document (scan image) using the image processing apparatus 10 will be described with reference to FIGS. 2 to 5. FIG. 2 is a flow chart illustrating processing for generating a translated document.

The image processing apparatus 10 transmits a scan instruction to the scanner 20. When the scanner 20 receives the scan instruction from the image processing apparatus 10, the scanner 20 generates a scan image by scanning a set document image with a CCD camera. The scanner 20 transmits the generated scan image to the image processing apparatus 10, and the image processing apparatus 10 receives and acquires the transmitted scan image (S101).

The image processing apparatus 10 analyzes the layout of the scan image received from the scanner 20 (S102) and specifies a sentence region included in the layout of the scan image. Here, as a specific example, an example of the layout of a scan image is shown in FIGS. 3A, 3B, 3C and 3D. As shown in FIGS. 3A, 3B, 3C and 3D, a scan image 200 includes sentence regions a to f.

The image processing apparatus 10 performs character recognition processing for recognizing a character, which is included in each sentence region, for the respective sentence regions a to f included in the analyzed layout (S103).

Figure 3A:
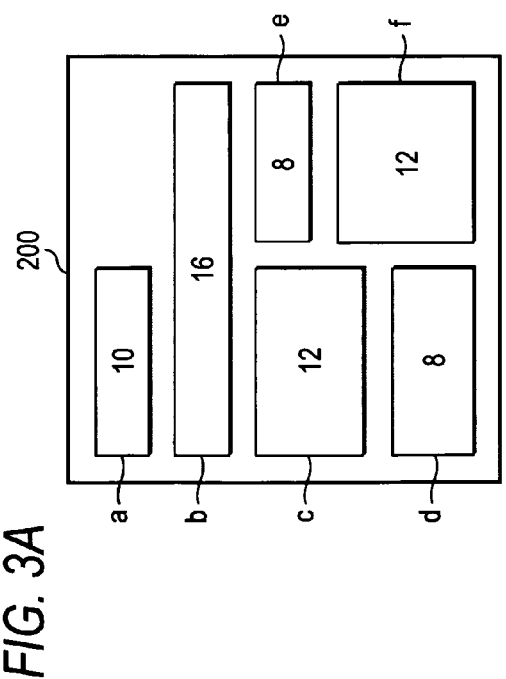

Then, the image processing apparatus 10 measures the character size for every sentence region (S104). For example, measurement of the character size may be performed by calculating an average or a mode of the sizes of characters recognized from a sentence region for every sentence region. In addition, those shown in the respective sentence regions of FIG. 3A are character sizes of the original acquired as a result of the measurement.

When the character size measurement processing is performed for all sentence regions, the image processing apparatus 10 classifies the sentence regions into groups based on the character sizes measured for the respective sentence regions (S105). In the exemplary embodiment, sentence regions having the same character size are classified into the same group. In the example shown in FIG. 3A, 'a', 'b', 'c, f', and 'd, e' are classified into different groups. In addition, the respective groups are set to G1(d, e), G2(a), G3(c, f), and G4(b) in the order in which the character size is small, and the character size of each group and the order corresponding to the character size are stored in a memory.

After the above-described grouping processing is completed, the image processing apparatus 10 performs processing for translating a sentence, which includes characters recognized in the respective sentence regions, into a given language (for example, English or Chinese) (S106).

After the above-described translation processing is completed, the image processing apparatus 10 determines the character size of each sentence region such that a sentence after translation (hereinafter, referred to as a translated sentence) fits in each sentence region and the relative character size relationship among document regions in the original is maintained (S107). Here, processing for determining the character size of each sentence region will be described with reference to a flow chart shown in FIG. 4.

Figure 3B:
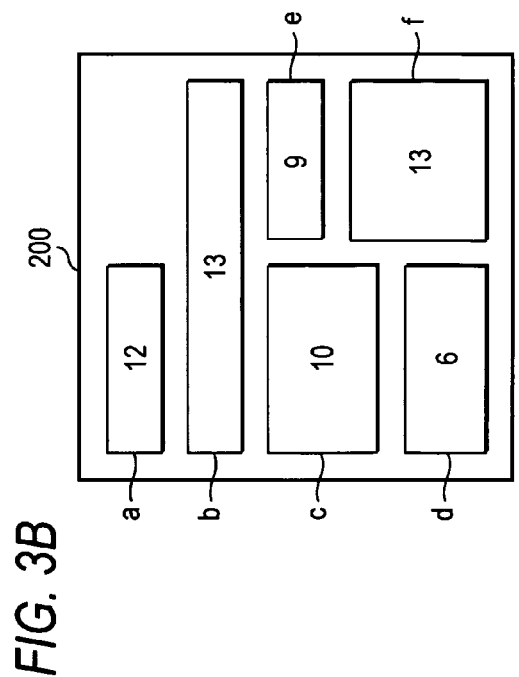
Figure 4:
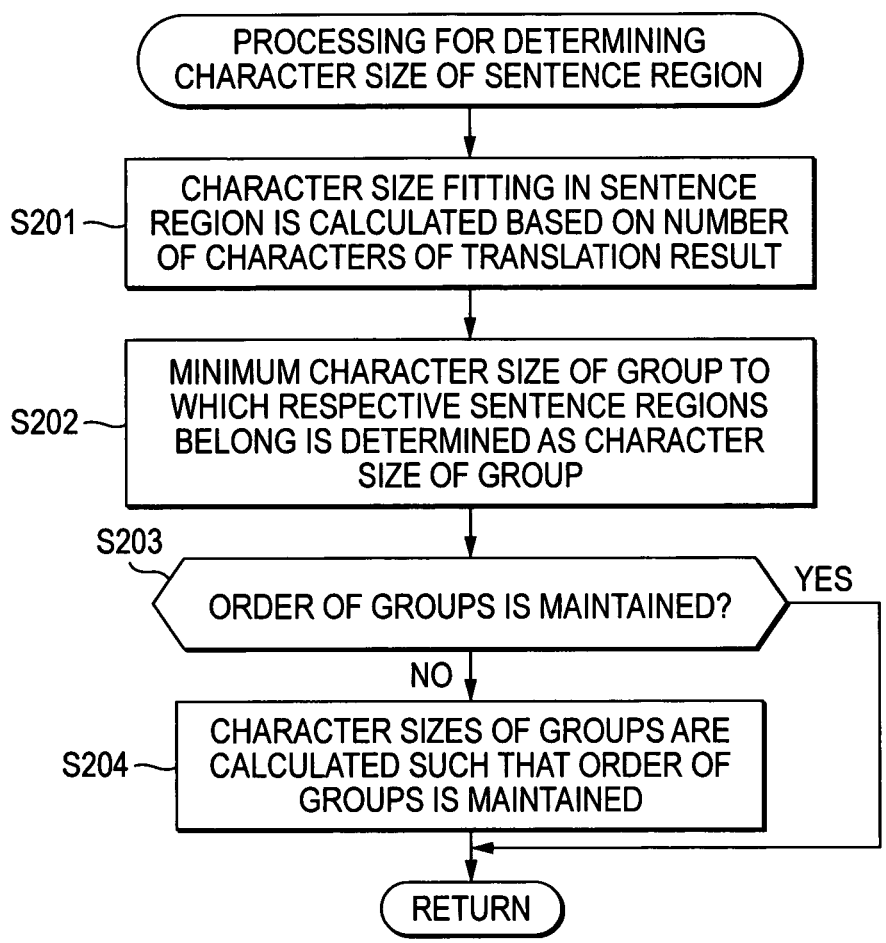
FIG. 4 is a flow chart illustrating processing for determining the character size of a sentence region.

First, for every sentence region, the image processing apparatus 10 calculates the character size fitting in a sentence region based on the size of the sentence region and the number of characters of a translated sentence, as shown in FIG. 4 (S201). In FIG. 3B, those shown in respective sentence regions are character sizes obtained by the above calculation.

After the processing for calculating the character size is completed, the image processing apparatus 10 determines, for every group, a minimum character size among character sizes of sentence regions, which belong to a group, as a character size of the group (S202). Then, all the character sizes of sentence regions belonging to the same group are provisionally changed to the determined group character size. This is the first correction of a character size. In FIG. 3C, those shown in respective sentence regions are character sizes changed by the first correction.

Then, after the character size determination processing is completed for all groups, the image processing apparatus 10 determines whether or not the order of character sizes among groups in an original document image is maintained based on the determined character sizes (S203). Here, if it is determined that the order among groups is not maintained (S203: N), the image processing apparatus 10 calculates the character size of each group so that the order of groups can be maintained and then sets the calculated value as a new character size (S204). This is the second correction of a character size.

Here, referring to FIGS. 5A, 5B, 5C and 5D, the processing for determining the character size of a group will be described with a specific example. FIGS. 5A, 5B, 5C and 5D show how the character size of each sentence region is determined according to the flow described above. That is, the image processing apparatus 10 first forms a group for every character size (FIG. 5A), calculates the character size fitting in the layout after translation processing (FIG. 5B), and then unifies the character size for every group (FIG. 5C). In this state., the image processing apparatus 10 determines whether or not the unified character sizes maintain the order in the original document. Determination on whether or not the order of groups is maintained is made by comparing character sizes, which are currently determined, with original-order character sizes in the order in which the character sizes currently determined is small.

In the example of the exemplary embodiment, 'd, e' is the group G1 and has the same order as the original order, but a next small group 'c, f' is the group G3. Accordingly, determination that the order of character sizes is different from that of the original is made. Here, in order to return the order of groups to the original state, the character size of the group G2 which is originally the second group is calculated such that the relative relationship of original character sizes among groups is maintained to be a size between the character size of a current first group after translation (G1), and the character size of a current second group after translation (G3). Calculation of the character sizes is performed based on a ratio of the original character sizes of the groups G1, G2, and G3. In the above example, a character size corresponding to the position at which a distance including a distance between the groups G1 and G2 and a distance between the groups G2 and G3 based on the ratio 8:10:12 of the original character sizes of the groups G1, G2, and G3 that is, a distance between the groups G1 and G3 shown in FIG. 5 is divided into 1:1 may be calculated such that the calculated value is set to the character size of the group. G2. In the case when the calculated character size is not an integral value, an integral value closest to the calculated character size may be set as a new character size. In addition, when the calculated character size is set to the character size of the new group G2, the order of the groups G3 and G4 is set to 3 and 4, respectively, such that the order of respective sentence regions becomes equal to the original state.

After the character size determination processing is completed, the image processing apparatus 10 proceeds to a process S108 in which a translated document is generated based on the determined character size of each sentence region (S108) and then processing is ended.

In addition, the invention is not limited to the above embodiment.

For example, it may be possible to cause the character size correcting section 112B to make further determination on whether or not a distance of character sizes between groups is smaller than a given distance and to correct the character sizes of the groups when it is determined that the distance of character sizes between groups is smaller than the given distance. Here, correction of the character sizes may be performed by arranging the character sizes between groups at equal distances.

In the case where it is determined that there is deviation in character size distribution of sentence regions classified into the same group and an element whose character size is largely different exists, it may be possible to cause the character size determining section 112 to exclude the element whose character size is largely different from the group.

In addition, the character size determining section 112 may match the character sizes based on a character size larger than a minimum character size by changing a horizontal to vertical ratio of a character when matching the character sizes of a group.

In addition, the length of a sentence of a region suppressed to have a small character size may be adjusted by adjusting a character distance or line spacing after translation of a sentence region.

The foregoing description of the exemplary embodiments of the present invention has been provided for the purposes-of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image processing apparatus comprising:
   a region dividing section that divides a document image into a plurality of sentence regions;
   a character recognizing section that recognizes characters included in the sentence regions;

a classifying section that classifies the sentence regions into a plurality of groups in accordance with sizes of the recognized characters;

a translating section that translates a sentence which includes the recognized characters in the corresponding sentence region, into a given language for each of the sentence regions;

a calculation section that calculates a character size of the translated sentence, based on a size, line spacing, and character spacing of the corresponding sentence region before translation and the number of characters of the translated sentence;

a character size information storing section that stores a ratio of the character sizes between at least two of the plurality of groups; and a correcting section that (i) corrects a size of at least one of the translated characters of any sentence region with characters of the same size classified into a same group such that the character sizes of the translated characters in the same group become equal, and (ii) corrects the size of at least one of the translated characters of any group based on the stored ratio of the character sizes between the at least two of the plurality of groups.

2. The image processing apparatus according to claim 1, wherein the correcting section makes correction so as to match a minimum character size among sentence regions classified into one of the groups by the classifying section.

3. The image processing apparatus according to claim 2, further comprising:

an order determining section that determines an order of the groups based on character sizes of the groups classified by the classifying section, wherein the correcting section corrects the character size of each of the sentence regions such that the order of the groups determined by the order determining section is maintained.

4. The image processing apparatus according to claim 1, further comprising:

an order determining section that determines an order of the plurality of groups based on character sizes of the classified groups, wherein the correcting section corrects the character sizes of each of the sentence regions such that the order of the groups determined by the order determining section is maintained.

5. The image processing apparatus according to claim 1, wherein the correcting section is configured to exclude one of the translated characters from the one of the groups if the character size of the one of the translated characters is larger or smaller than that of remaining translated characters within the one of the groups.

6. An image processing method comprising:

dividing a document image into a plurality of sentence regions;

recognizing characters included in the sentence regions;

classifying the sentence regions into a plurality of groups in accordance with sizes of the recognized characters;

translating a sentence which includes the recognized characters in the corresponding sentence region, into a given language for each of the sentence regions;

calculating a character size of the translated sentence, based on a size, line spacing, and character spacing of the corresponding sentence region before translation and the number of characters of the translated sentence;

storing a ratio of the character sizes between at least two of the plurality of groups;

correcting (i) a size of at least one of the translated characters of any sentence region with characters of the same size classified into a same group such that the character sizes of the translated characters in the same group become equal, and (ii) the size of at least one of the translated characters of any group based on the stored ratio of the character sizes between the at least two of the plurality of groups.

7. The image processing method according to claim 6, wherein correcting the size of the translated character includes, correcting so as to match a minimum character size among sentence regions classified into one of the groups.

8. The image processing method according to claim 7, further comprising:

determining an order of the groups based on character sizes of the classified groups, wherein correcting the size of the translated character, includes correcting the character size of each of the sentence regions such that the determined order of the groups is maintained.

9. The image processing method according to claim 8, further comprising:

storing a ratio of the character sizes of the classified groups, wherein correcting the size of the translated character includes, correcting the character size of each of the groups based on the stored ratio of the character sizes of the groups.

10. The image processing method according to claim 6, further comprising:

determining an order of the plurality of groups based on character sizes of the classified groups, wherein the correcting step includes correcting the character sizes of each of the sentence regions such that the determined order of the groups is maintained.

11. A non-transitory computer readable medium storing a program causing a computer to execute a process for processing an image, the process comprising:

dividing a document image into a plurality of sentence regions;

recognizing characters included in the sentence regions;

classifying the sentence regions into a plurality of groups in accordance with sizes of the recognized characters;

translating a sentence which includes the recognized characters in the corresponding sentence region, into a given language for each of the sentence regions;

calculating a character size of the translated sentence, based on a size, line spacing, and character spacing of the corresponding sentence region before translation and the number of characters of the translated sentence;

storing a ratio of the character sizes between at least two of the plurality of groups:

correcting (i) a size of at least one of the translated characters of any sentence region with characters of the same size classified into a same group such that the character sizes of the translated characters in the same group become equal, and (ii) the size of at least one of the translated characters of any group based on the stored ratio of the character sizes between the at least two of the plurality of groups.

* * * * *